United States Patent
De Ranter et al.

(10) Patent No.: US 9,985,663 B2
(45) Date of Patent: May 29, 2018

(54) METHOD AND SYSTEM FOR MULTI-BAND TRANSCEIVER FRONT-END ARCHITECTURE WITH REDUCED SWITCH INSERTION LOSS

(71) Applicant: Maxlinear, Inc., Carlsbad, CA (US)

(72) Inventors: Carl De Ranter, Carlsbad, CA (US); Branislav Petrovic, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 192 days.

(21) Appl. No.: 14/935,239

(22) Filed: Nov. 6, 2015

(65) Prior Publication Data

US 2016/0134309 A1 May 12, 2016

Related U.S. Application Data

(60) Provisional application No. 62/076,351, filed on Nov. 6, 2014.

(51) Int. Cl.
*H04B 1/00* (2006.01)
*H04L 5/14* (2006.01)
*H04L 12/937* (2013.01)

(52) U.S. Cl.
CPC ............... *H04B 1/006* (2013.01); *H04L 5/14* (2013.01); *H04L 49/253* (2013.01)

(58) Field of Classification Search
CPC .......... H04B 1/006; H04L 5/14; H04L 49/253
See application file for complete search history.

(56) References Cited

U.S. PATENT DOCUMENTS 9,240,811 B2 * 1/2016 Norholm ................. H04B 1/56
2015/0249479 A1 * 9/2015 Nobbe ..................... H04B 17/12
455/77

* cited by examiner

*Primary Examiner* — Sai Ming Chan
(74) *Attorney, Agent, or Firm* — McAndrews, Held & Malloy (57) ABSTRACT

Methods and systems for a multi-band transceiver front-end architecture with reduced insertion loss may comprise, in a transceiver comprising a first plurality of switches (each with a common terminal coupled to a transmit signal path), a second plurality of switches (each with a common terminal coupled to a receive signal path), and a plurality of communications links: operatively coupling the transmit signal path to one of the communications links using one of the first switches when the transceiver is in a transmit mode, and operatively coupling the receive signal path to one of the communications links using one of the second switches when the transceiver is in a receive mode. An off capacitance of at least one of the switches may be reduced utilizing an operatively coupled inductive element. The inductive element may comprise an inductor operatively coupled in series with the transmit signal path.

20 Claims, 6 Drawing Sheets

METHOD AND SYSTEM FOR MULTI-BAND TRANSCEIVER FRONT-END ARCHITECTURE WITH REDUCED SWITCH INSERTION LOSS

CROSS-REFERENCE TO RELATED APPLICATIONS/INCORPORATION BY REFERENCE

This application makes reference to and claims priority to U.S. Provisional Application Ser. No. 62/076,351 filed on Nov. 6, 2014. The above identified application is hereby incorporated herein by reference in its entirety.

FIELD

Certain embodiments of the disclosure relate to communication. More specifically, certain embodiments of the disclosure relate to a multi-band transceiver front-end architecture with reduced insertion loss.

BACKGROUND

Conventional transceiver circuits with transmit/receive and routing switches can be inefficient and/or ineffective. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method for a multi-band transceiver front-end architecture with reduced insertion loss substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a multi-band transceiver front-end architecture with reduced insertion loss. Exemplary aspects may comprise, in a transceiver comprising a first plurality of switches (each with a common terminal coupled to a transmit signal path), a second plurality of switches (each with a common terminal coupled to a receive signal path), and a plurality of communications links: operatively coupling the transmit signal path to one of the plurality of communications links using one of the first plurality of switches when the transceiver is in a transmit mode, and operatively coupling the receive signal path to one of the plurality of communications links using one of the second plurality of switches when the transceiver is in a receive mode. An off capacitance of one or both of the first and second pluralities of switches may be reduced utilizing an operatively coupled inductive element. The inductive element may comprise an inductor operatively coupled in series with the transmit signal path. The inductive element may comprise an inductor operatively coupled between the coupled receive signal path and ground. The inductive element may be coupled to the one or both of the first and second pluralities of switches utilizing one of a third plurality of switches. A bandwidth of one or both of the first and second pluralities of switches may be tuned by operatively coupling at least one inductor to the one or both of the first and second pluralities of switches. The transceiver may comprise a time division duplex (TDD) transceiver. Signals may be received via one of said plurality of communications links when in said receive mode. Signals may be transmitted over one of said plurality of communications links when in said transmit mode.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
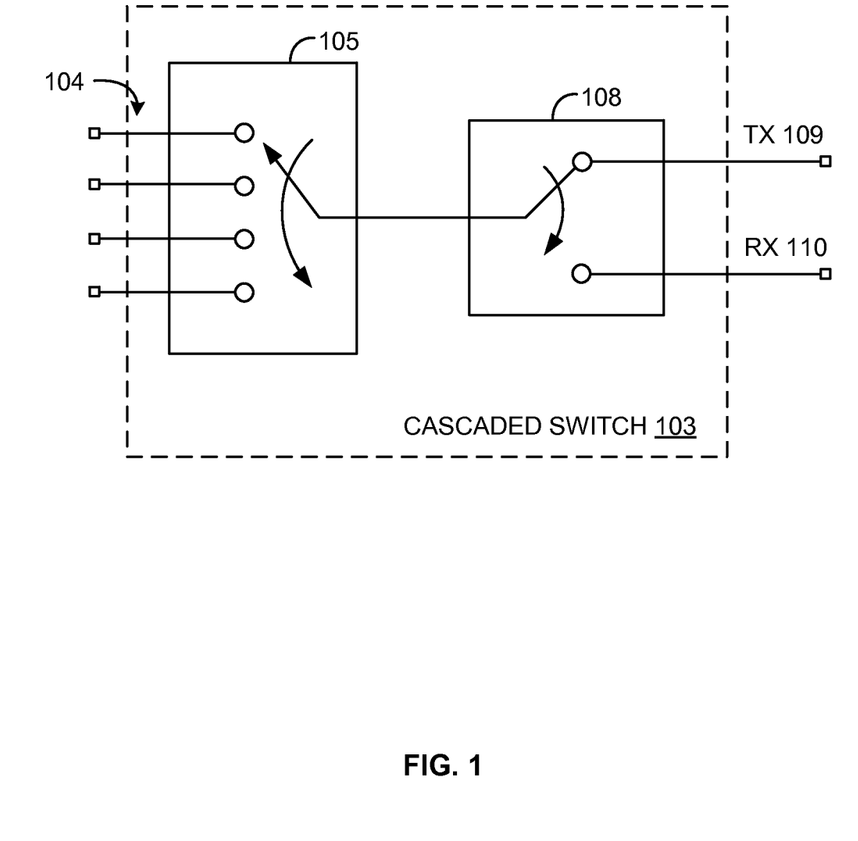
FIG. 1 is a diagram illustrating a cascaded switch, in accordance with an example embodiment of the disclosure.

FIG. 1 is a diagram illustrating a cascaded switch, in accordance with an example embodiment of the disclosure. This example includes a transmit/receive ("T/R") switch 108 cascaded with a routing switch 105 to allow routing of TDD communications. In this example, transmit signals 109 or receive signals 110 can be selected by T/R switch 108. One of a plurality of communication links 104 (four shown) may be selected by routing switch 105. The communication links 104 can be used, for example, for communications at different frequency bands, or for different antennas, or both.

Duplex communications generally refers to communications in two directions—e.g., in the transmit and receive directions. Time Division Duplex (TDD) schemes generally separate in time the transmit and receive signals over a given communication link. TDD can be used, for example, to emulate full duplex communications over a half-duplex communication link.

The application of TDD generally involves a transmit/receive switch (T/R switch) such that the transmitter and a receiver of a given transceiver can be alternatively switched for communication over the subject communication link. In some applications, the T/R switch may be combined in conjunction with a routing switch to allow the TDD communications to be routed over a selected one of a plurality of communication links. That is, in many applications, the T/R switch and a multi-throw routing switch used to realize the switching between different bands (diplexers or antennas) are implemented as separate entities, connected in series.

Accordingly, cascaded switch 103 allows routing of TDD signals to/from any of these communication links 104. However, switches generally introduce an insertion loss and some level of distortion into the communication path. In instances where two switches are cascaded, such as with cascaded switch 103, the insertion loss and distortion introduced by both switches affects the communication link.

Embodiments of the technology disclosed herein are directed toward devices and methods for providing T/R and routing switching with reduced insertion loss as compared to conventional cascaded switches. Embodiments are provided in which a single switch is inserted in-line with the communication path selected between one of the transmitter and receiver, and one of the communication links.

Figure 2:
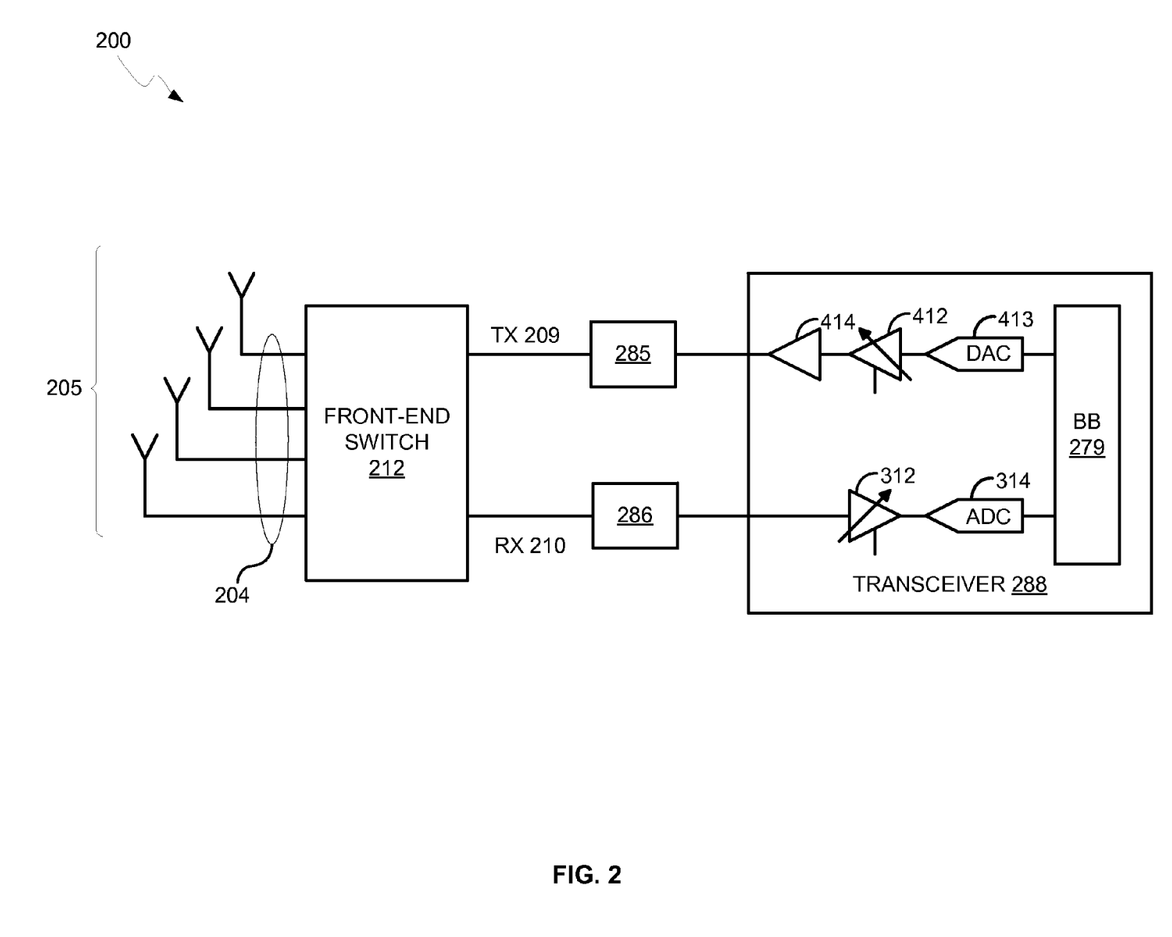
FIG. 2 is a diagram illustrating an example of a wideband transceiver with a low insertion loss T/R and routing switch in accordance with one embodiment of the technology disclosed herein.

FIG. 2 is a diagram illustrating an example of a wideband transceiver with a low insertion loss T/R and routing switch in accordance with one embodiment of the technology disclosed herein. This example includes a communication transceiver 288, a front-end switch 212, and a plurality of communication links 204. In some embodiments, some or all of the communication links 204 can be implemented as operating at different frequencies. Accordingly, front-end switch 212 can be implemented to select from among the transmit and receive lines (e.g. in a TDD fashion) and to select the appropriate communication link 204 for transmission or reception.

As seen in this example, communication transceiver 288 may comprise both transmit and receive capabilities. Communication transceiver 288 may be implemented, for example, as a system-on-a-chip (SOC) transceiver. The transceiver 288 may comprise a baseband processor 279 to perform communication functions in the digital domain. One example of the communication transceiver 288 is a MoCA SOC transceiver, although other transceivers may be used for other communication protocols and standards.

On the transmit communication path, the transceiver 288 also comprises a power amplifier 414, a variable gain amplifier 412, a digital-to-analog converter (DAC) 413, and the baseband processor 279.

On the receive communication path, a received signal from one of the antennas 205 may be switched to the receive signal path 210 by front-end switch 212. The matching network and/or filter 286 may be included in the receive signal path. A variable gain amplifier VGA 312 may be utilized to adjust the level of the incoming signal to provide the appropriate signal strength. Analog-to-digital converter (ADC) 314 may digitize the received signal for baseband processing.

On the transmit side, the digital-to-analog converter 413 may digitize the outgoing signal received from baseband processor 279. The variable gain amplifier 412, and power amplifier 414 may drive the output signal. A matching network and/or filter 285 may be utilized in the transmit signal path 209. Although not illustrated, a balun may also be included for converting an unbalanced signal to balanced, or vice-versa. Front-end switch 212 may switch the transmit signal from transmit signal path 209 to a selected one of the antennas 205.

Figure 3:
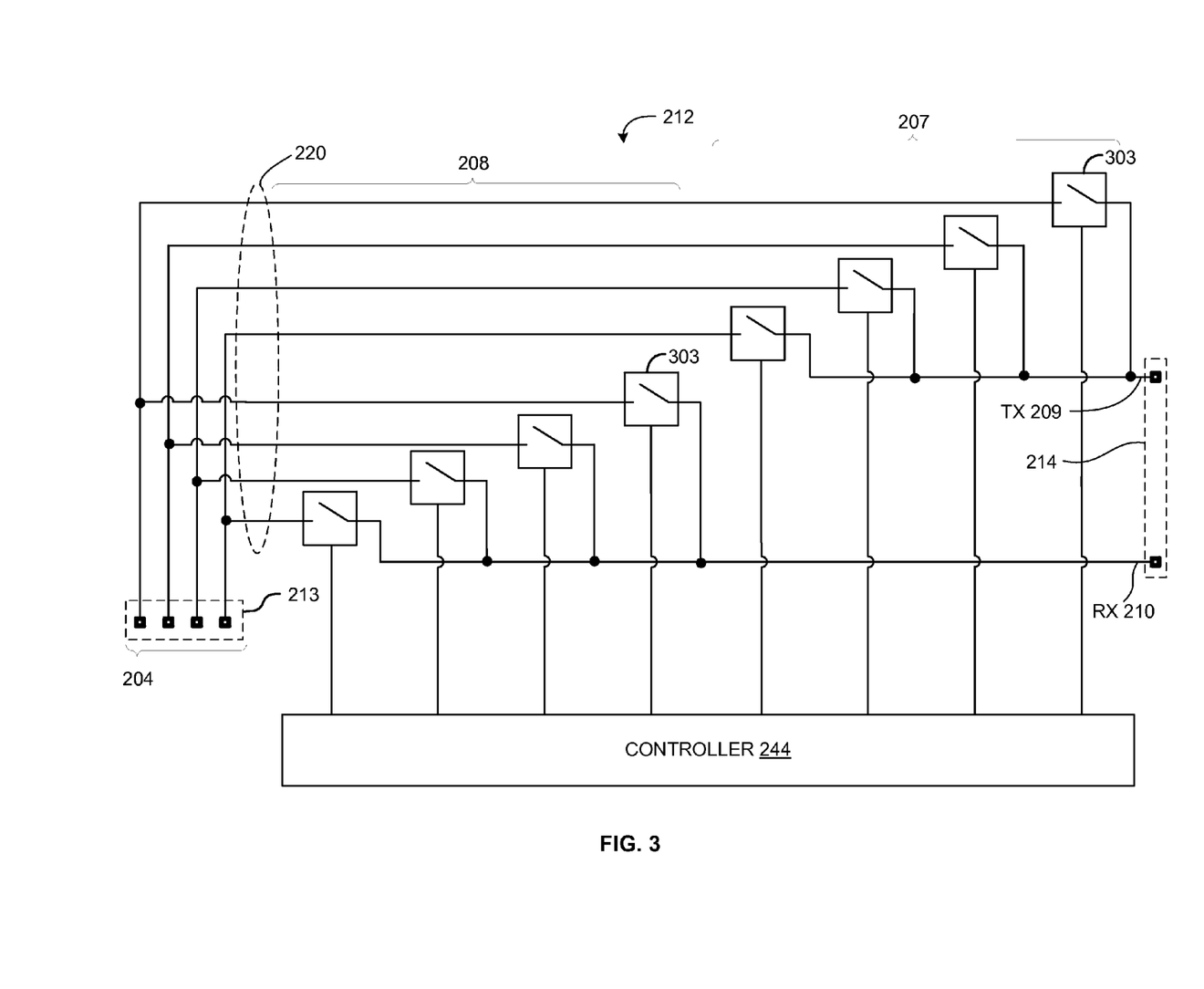
FIG. 3 is a diagram illustrating an example of a front-end switch, in accordance with an example embodiment of the disclosure.

FIG. 3 is a diagram illustrating an example of a front-end switch, in accordance with an example embodiment of the disclosure. In this example, a plurality of switches 303 are shown (only two switches include reference characters in the figure to avoid clutter). A first bank 207 of switches 303 is connected to interface with transmit signal path 209, while a second bank 208 of switches 303 is configured to interface with receive signal path 210.

Each switch 303 in both banks of switches 207, 208 has an input terminal, an output terminal and a control line. The input terminals for switches 303 in the first bank 207 may be electrically connected to one another to form a transmit signal path that may be electrically connected to the transmit signal path of the transmitter side of the transceiver (e.g., communication transceiver 288). This electrical connection to the transmitter may be made, as illustrated in this example, via one of the terminals 214. The output terminals for switches 303 in first bank 207 may be electrically connected to a plurality of parallel communication paths, or interconnects 220, that, in this example, are electrically connected to corresponding communication link terminals 213. The output terminals of switches 303 in first bank 207 may also be electrically connected to the input terminals of switches 303 in second bank 208 (which may also be electrically connected to corresponding communication link terminals 213 via interconnects 220). The output terminals of switches 303 in second bank 208 may be electrically connected to one another to form a received signal path that can be electrically connected to the receive signal path of the receiver side of the transceiver (e.g., communication transceiver 288). This electrical connection to the receiver can be made, as illustrated in this example, via the other one of the terminals 214.

As seen from this illustration, the front-and switch may be implemented to effectively perform a parallel-to-serial or serial-to-parallel conversion for the receive and transmit sides respectively. That is, a transmit signal received by the front-end switch 212 via transmit signal path 209 may be received on a single line and directed to one of a plurality of effectively parallel communication links at the outputs of the first bank 207 of switches 303. Likewise, receive signals received on one of the plurality of effectively parallel communication links may be switched by second bank 208 onto the single receive signal path 210.

In this example, there are four possible communication links 204 that may be switched to the transmitter or receiver. Each of these communication links may be connected to an input of the corresponding switch 303 of second bank 208, and each of the communication links 204 may also be connected to an output of its corresponding switch 303 of first bank 207. In an example scenario, a front-end switch 212 may be implemented to interface with any of a number of communication links 204 and any of a number of transmit and receive paths.

This example also illustrates a controller 244 that may control front-end switch 212. In operation, when the system is operating in the receive mode, it may be desirable to switch a received signal from the appropriate communication link 204 to receive signal path 210. Accordingly, one of switches 303 in second bank 208 is actuated, or closed, to couple the corresponding communication link 204 to receive signal path 210. This operation may be undertaken by controller 244, which may be configured to send a control signal to the selected switch 303 to close, or actuate, the switch and complete the signal path between the designated communication link 204 and receive signal path 210. Similarly, for transmit operations, the appropriate switch 303 in first bank 207 of switches 303 may be closed to electrically connect transmit signal path 209 to the corresponding one of the communication links 204. This may be done by controller 244 sending the appropriate control signal to actuate the selected switch 303 for the desired connection.

Figure 4:
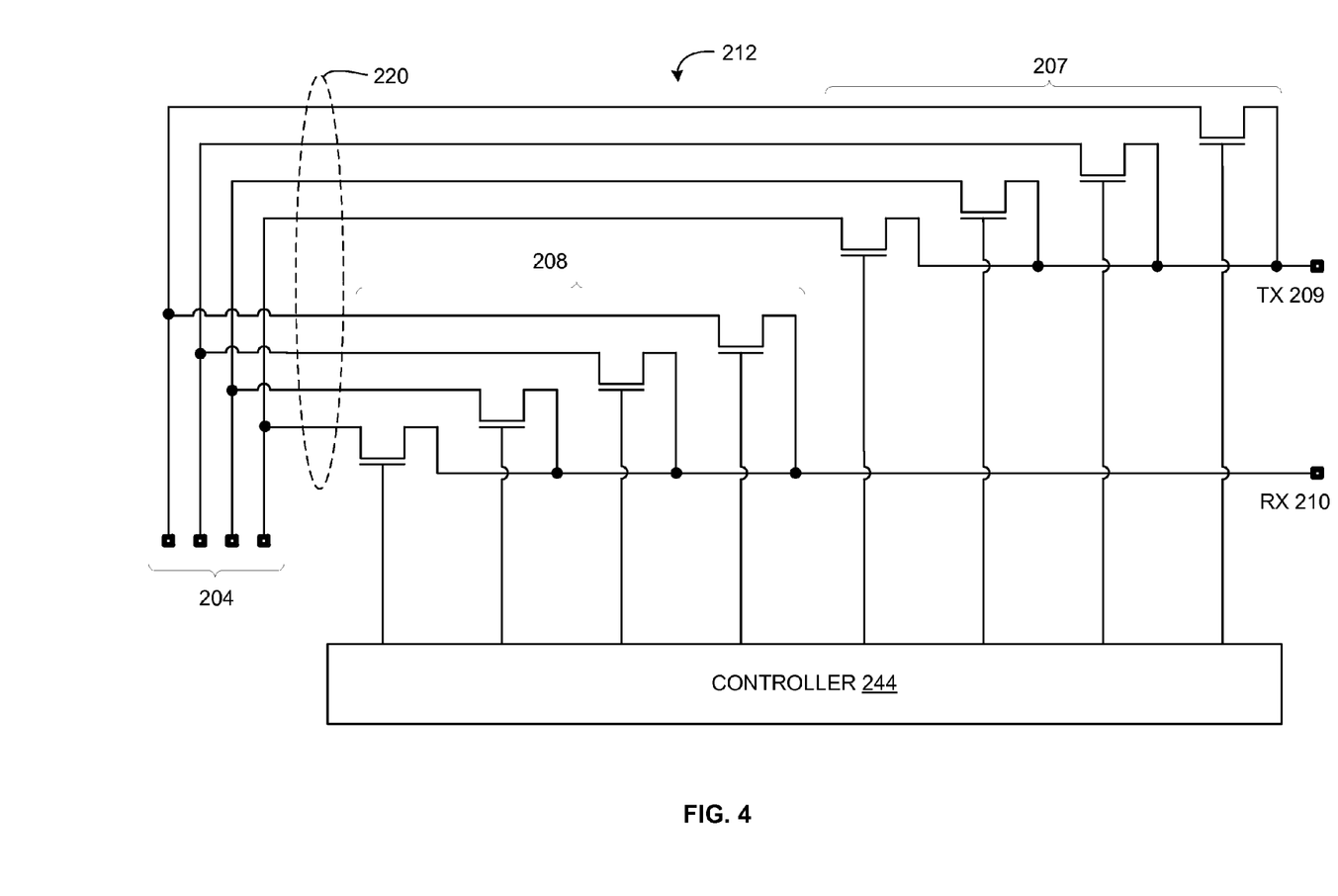
FIG. 4 is a diagram illustrating an example implementation of the front-end switch of FIG. 3, in accordance with an example embodiment of the disclosure.

FIG. 4 is a diagram illustrating an example implementation of the front-end switch of FIG. 3, in accordance with an example embodiment of the disclosure. In this example, the first and second banks of switches 207, 208 are implemented as a plurality of transistors that may be controlled by controller 244. Depending on the implementation, the transistors may be implemented as CMOS, MOSFET, MESFET, JFET, or BJT, for example, while other example transistor types may also be used. Likewise, other switches or relays may be used. The switches 207, 208 may be coupled to communication link 204 via the interconnects 220, while the opposite terminals (source vs. drain in the MOSFET example) may comprise the transmit and receive signal paths 209 and 210.

In operation, controller 244 effectively closes the switch by turning the appropriate corresponding transistor on. This may be accomplished, for example, by applying an appropriate voltage to that transistor. In the illustrated embodiment, the appropriate turn-on voltage can be applied to the gate of the transistor by controller 244, thereby electrically connecting the source and the drain of that transistor. The other transistors may remain open, or off, by grounding, floating, or simply not providing a turn-on voltage to those transistors.

As noted above, one goal of certain embodiments may be to reduce the insertion loss introduced by the switch. One way in which a lower insertion loss may be achieved is by using larger transistors. However, larger transistors also lead to a larger capacitance introduced into the circuit when the transistors are in the off state. Accordingly, embodiments may be implemented to optimize the balance between the on performance and the off performance of the switches. In some embodiments, a decrease in the size of the transistor may lead to a relatively small decrease in the on performance of the switch (e.g. a minimal increase for the insertion loss) and a relatively larger increase in off performance (e.g. a reduction in off capacitance, leading to a reduction in loading and noise).

Additionally, in further embodiments, parasitic capacitance introduced by the transistors can be tuned out by, for example, adding inductive elements into the circuit. However, the addition of inductive elements may have the effect of narrowing the bandwidth of the switches. The narrowing of the bandwidth may be acceptable in some applications where the bandwidth of the switch coincides with the communication band or bands of the transmitter and receiver. Therefore, in some embodiments, different elements at different inductance values may be selectively switched into and out of the circuit. Accordingly, embodiments can be implemented to eliminate or reduce capacitance of the off state, while reducing or minimizing negative repercussions caused by the narrowed bandwidth by tuning the switches for the desired band of operation.

In various embodiments, controller 244 may be configured to control switches (e.g., transistors or other switches) to switch different inductance values into and out of the circuit for tuning purposes. In some embodiments, controller 244 may receive as input, information identifying the selected band at which the system is operating, and to switch the appropriate tuning elements into and out of the circuit to tune the switches for the operating frequency. Accordingly, capacitance of the switches in the off state can be reduced using inductive elements, and the bandwidth of switches may be tuned to the operating frequency. In another example scenario, manual tuning may be enabled by user selectable switches such as, for example, physical switches that can be set by the user, or programmable switches that can be controlled through a user interface. In addition, the frequency detection module may sense the frequency of the communication links. The sensed frequency may be fed to controller 244 so that controller 244 may tune the switches accordingly. In applications where the system may be operating at one of a variety of predefined frequencies or channels, there can be a limited number of tuning configurations to tune to the possible channels. Where there is a limited quantity of known frequencies or channels, the system may be simplified accordingly.

Figure 5:
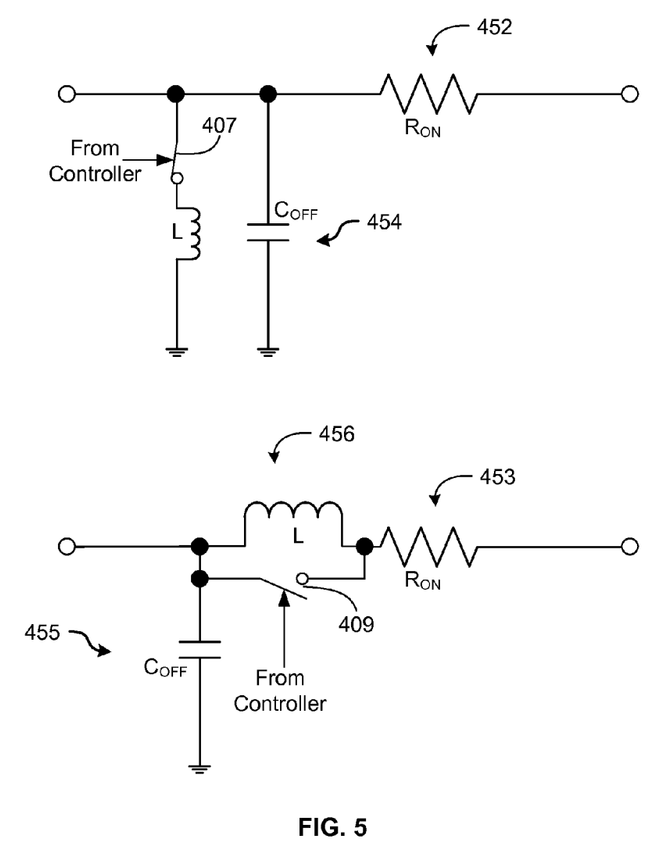
FIG. 5 is a diagram illustrating an example of adding inductance to reduce the effect of capacitance for the switches, in an example embodiment of the disclosure.

FIG. 5 is a diagram illustrating an example of adding inductance to reduce the effect of capacitance for the switches, in an example embodiment of the disclosure. In the first example, the inductance is added in parallel to the capacitance of the switch. In this example, resistor 452 represents the on resistance of the switch $R_{ON}$. capacitance 454 represents the capacitance $C_{OFF}$ introduced by the switch in the off position and the switch 407 may be utilized to switch the inductor L into the circuit, and may be one of an array of switches 407 that may each couple one or more of an array of inductors to the switches 207, 208. In the case of x number of switches, the total capacitance $C_{TOT}$ introduced by the switches in the off state is (x−1) times the off capacitance $C_{OFF}$ of the switches. In other words $C_{TOT}=(x-1) \times C_{OFF}$. From this, the resonant frequency can be determined as $$f_R = \frac{1}{2\pi}\sqrt{LC_{TOT}}.$$

This equation may be used so that the inductance, L, can be selected to tune the bandwidth to the desired operating band. Another example illustrated in the lower half of FIG. 5 shows a series inductance L used to tune the bandwidth of the circuit. In this example, inductor 456 may be configured in series with the on resistance $R_{ON}$ of the switch 453 utilizing the switch 409, where the switch 409 may be one of an array of switches 409 for coupling inductors in series with the switches 207, 208. Capacitance 455 represents the capacitance $C_{OFF}$ introduced by the switch in the off position. While the example in the upper half of FIG. 5 illustrates a bandpass filter, the example of lower half of FIG. 5 illustrates a low pass filter.

In embodiments where the inductance is added to create a bandpass filter, (i.e. the inductance is added in parallel with the capacitance) a tuning inductor can be included, for example, between receive signal line 210 and ground. Placing the inductance here, as opposed to one or the other side of the switches, may allow the tuning to be accomplished with only one inductor (or only one inductor for each frequency in the embodiments where the bandwidth can be selectively tuned) for the entire bank. Similarly, for a low pass filter implementation a single inductor can be provided in series in transmit signal path 209 to provide the series inductance for each of the switches in first switch bank 207. This can be advantageous over providing an inductor at the output of each switch in first switch bank 207.

In both examples illustrated in FIGS. 3 and 4, four communication links 204 are interfaced to two transceiver lines—i.e., a transmit and receive line. As noted above, the front-end switch 212 may be scaled to accommodate any quantity of communication links, and can also be scaled to handle more than one each of transmit and a receive signal paths. Where there is one transmit and one receive signal path (i.e., two paths), 2n switches (e.g. switches 303) are used to interface to n number of communication links. As a further example, where there are m transmit and receive signal paths in total and n communication links, selectability of all possible permutations may be accomplished with m*n switches.

As these examples illustrate, there may be one bank of switches for each transmit or receive line to be selected, and the number of switches in each bank corresponds to the number of possible communication links with which that bank (particularly, its corresponding transmit or receive signal path) may be coupled. In the illustrated example, each transmit and receive signal path can be selectively coupled to any one of the available communication links. However, in alternative embodiments, configurations can be implemented such that one or more of the transmit or receive signal paths can be coupled to fewer than all of the available communication links.

As the above examples illustrate, regardless of the communication link selected, and regardless of whether the system is operating in the transmit or the receive mode, embodiments may be implemented in which only one switch is inserted into the signal path to handle this front-end switching. This is in contrast to conventional solutions in which two switches are required in series to handle the switching. Accordingly, embodiments may be implemented in which the insertion loss and/or distortion for the front-end switch are lower than that which may otherwise be achieved with cascaded T/R and routing switches in conventional solutions.

In various embodiments, the layout of the front-end switch 212 may provide isolation between the various signal paths to avoid crosstalk or other interference. For example, in various embodiments, the signal paths may be laid out orthogonal to one another or with sufficient spacing between one another to avoid crosstalk interference. This may depend, for example, on the isolation requirements specified for the switches for a given application.

The switch array 212, and in some embodiments the controller, may be implemented on a single die as a stand-alone unit, or it may be integrated with the transceiver. In some embodiments, the switch array die can be implemented using thick film 0.18 µm SOI. Some embodiments can include a low noise amplifier on the receive path to overcome noise spurs at the receive input pin of the transceiver. This may be particularly useful where a single-ended implementation is chosen.

Figure 6:
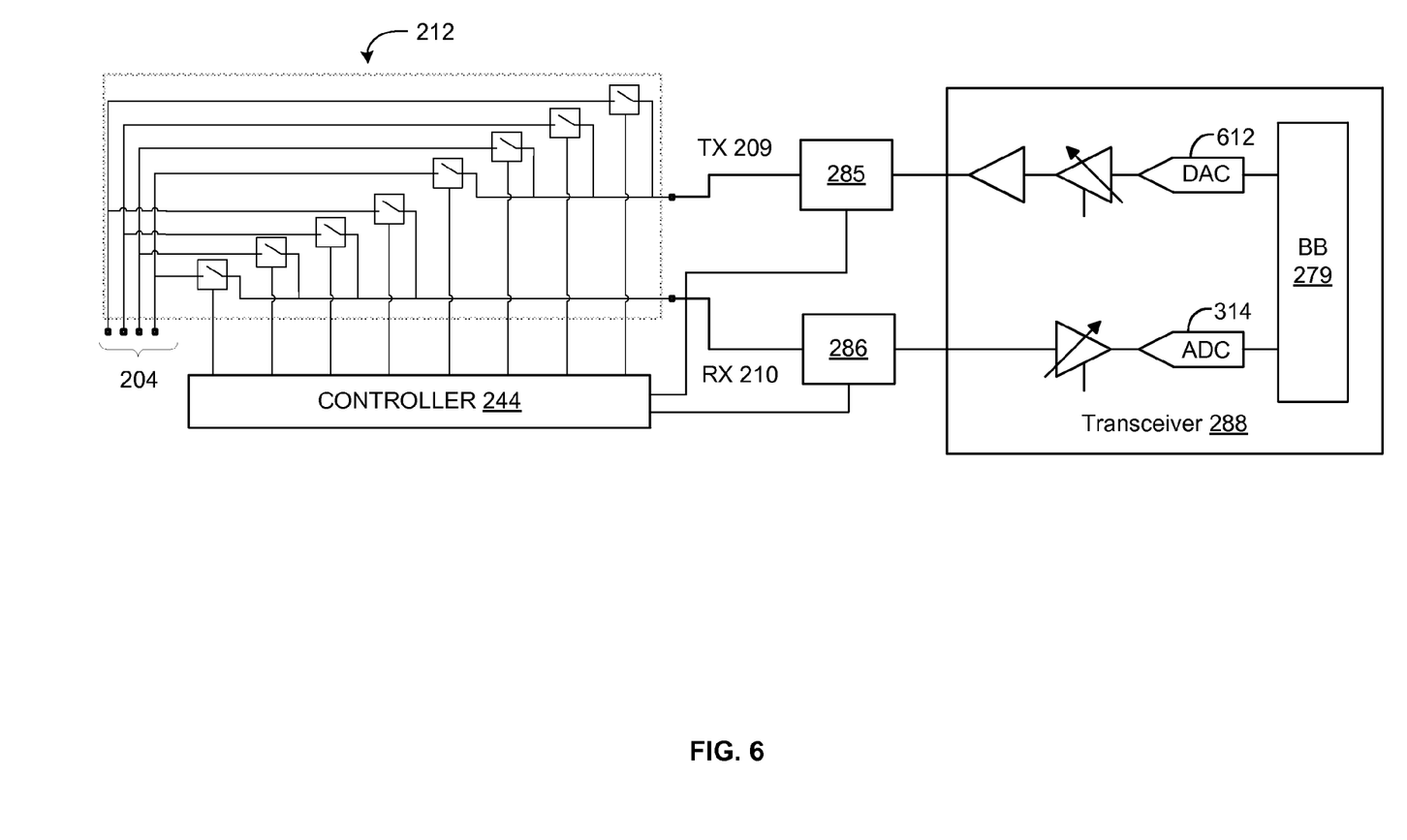
FIG. 6 is a diagram illustrating an example in which a front-end switch is implemented with a communication transceiver, in accordance with an embodiment of the disclosure.

FIG. 6 is a diagram illustrating an example in which a front-end switch 212 (e.g., such as that depicted in FIGS. 3 and 4) is implemented with a communication transceiver, in accordance with an embodiment of the disclosure. As seen in this example, one bank of the front-end switch 212 may be interfaced with transmit signal path 209 and another bank of front-end switch 212 is interfaced with receive signal path 210.

Controller 244 may be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Controller 244 may comprise, or have access to, a non-transitory storage medium with computer program code or other like instructions embodied thereon configured to cause a processing device of the controller (e.g., one or more processors) to perform the described functions. In addition, the controller 244 may control the matching networks and/or matching filters 285, 286, such as is illustrated with the configurable inductive elements in FIG. 5, i.e., the controller 244 may control the arrays of switches 407, 409.

In operation, the front-end switch 212 may receive RF signals from one or more antennae via the one of the communication links 204 and communicate the received signals to the Rx path 210 and the matching network and/or filter 286 before being communicated to the transceiver 288. In addition, the front-end switch 212 may receive signals to be transmitted from the transceiver 288 via the matching network and/or filter 285 before being switched to an appropriate antenna 204.

In an embodiment of the disclosure, a transceiver is disclosed comprising a first plurality of switches each with a common terminal coupled to a transmit signal path, a second plurality of switches each with a common terminal coupled to a receive signal path, a controller, and a plurality of communications links, where each is coupled to one of the first plurality of switches and one of the second plurality of switches, and where the controller is operable to: operatively couple said transmit signal path to one of said plurality of communications links utilizing one of said first plurality of switches when in a transmit mode, and operatively couple one of said plurality of communications links to said receive signal path utilizing one of said second plurality of switches when in a receive mode.

An off capacitance of one or both of the first and second pluralities of switches may be reduced utilizing an operatively coupled inductive element. The inductive element may comprise an inductor operatively coupled in series with the transmit signal path. The inductive element may comprise an inductor operatively coupled between the coupled receive signal path and ground. The inductive element may be coupled to the one or both of the first and second pluralities of switches utilizing one of a third plurality of switches.

A bandwidth of one or both of the first and second pluralities of switches may be tuned by operatively coupling at least one inductor to the one or both of the first and second plurality of switches. The transceiver may comprise a time division duplex (TDD) transceiver. Signals may be received via one of said plurality of communications links when in said receive mode. Signals may be transmitted over one of said plurality of communications links when in said transmit mode.

In another example scenario, a transceiver is disclosed, the transceiver comprising a first plurality of switches each with a common terminal coupled to a transmit signal path, a second plurality of switches each with a common terminal coupled to a receive signal path, a controller, and a plurality of communications links comprising at least one antenna, where each link is coupled to one of the first plurality of switches and one of the second plurality of switches, and where the controller is operable to: operatively couple said transmit signal path to one of said plurality of communications links utilizing one of said first plurality of switches when in a transmit mode, where only one of the first plurality of switches is present in an electrical path from the transmit signal path to the one of the plurality of communications links when in the transmit mode, and operatively couple one of the plurality of communications links to said receive signal path utilizing one of the second plurality of switches when in a receive mode, where only one of the second plurality of switches is present in an electrical path from the receive signal path to the one of the plurality of communications links when in the receive mode.

According to various embodiments of the disclosed technology a T/R switch for communication transceivers is provided. More particularly, some embodiments relate to a switch configuration that can be used with a transceiver front-end to provide T/R switching and band or antenna switching. Embodiments can be implemented in which a single switch is inserted in-line with the communication path selected between one of the transmitter and receiver, and one of the communication links. In various embodiments, each band may be implemented to include its own matching network and/or diplexer such as, for example, with a MoCA multi-band adapter.

In various embodiments, the transceiver front-end switch may be implemented in a single die. By integrating the functionality of the T/R switch and the multi-throw routing switch in one (small) die, the optimal technology can be chosen to enable stacked-device switches that allow the large single-ended voltages as required by cellular, wireless or wireline transmit/receive standards (as GSM, WiFi, MoCA, etc.), without a big impact on the overall BOM (Bill of Materials) cost.

In an example scenario, lower required Pout,max for the line driver/power amplifier (transmit path) for a given required output power at the antenna or connector may be enabled utilizing the front-end switch. Various embodiments may achieve better sensitivity for the receive path for a given noise figure (NF) of the low noise amplifier (LNA). Because the LNA NF may be, in practice, generally optimized in most applications, this may be the only way that input sensitivity can be increased or maximized. Additionally, an overall lower power consumption may be obtained due to lower required Pout,max and possibly relaxed (higher allowable) NF.

According to an example embodiment of the disclosure, a T/R and routing switch for a communication transceiver may comprise: a first plurality of switches, each switch of the first plurality of switches having an input terminal, an output terminal and a control terminal, wherein the input terminals of each of the first plurality of switches may be electrically connected to one another to form a common transmit signal path, a second plurality of switches, each switch of the second plurality of switches having an input terminal, an output terminal and a control terminal, wherein the output terminals of each of the switches may be electrically connected to one another to form a common receive signal path, a plurality of interconnects, each interconnect connecting an output terminal of one of the first plurality of switches with an input terminal of one of the second plurality of switches to form an input/output link for interconnected pairs of switches, and a plurality of communication link terminals, each communication link terminal electrically connected to one of the input/output links.

The T/R and routing switch may be configurable such that only a single one of the first and second plurality of switches is inserted in-line to perform front-end routing of either a transmit or a receive signal between a transmitter or receiver of the communication transceiver and one of a plurality communication links over which the communication transceiver communicates.

A controller may be utilized to actuate one of the plurality of switches to electrically connect one of a transmit and a receive signal path of a communication transceiver to one of a plurality of communication links. This may be done so that only a single switch of the T/R and routing switch is in line between the transceiver and the selected communication link.

In various embodiments, the T/R and routing switch may comprise inductive elements, such as inductors, configured to reduce an off capacitance of the plurality of transistors that are not turned on. Inductive elements may be connected in series with the transmit signal path. Inductive elements may also be connected between the common receive signal path and ground. In some embodiments, the inductive elements comprise a plurality of inductors and a third plurality of switches each switch connected between one of the inductors and one of the first and second plurality switches. The controller may further be configured to control the third plurality of switches to select a subset of at least one of the plurality of inductors to tune the bandwidth of at least one of the first and second plurality of switches.

The T/R and routing switch may also comprise one or more additional pluralities of switches each of the additional pluralities of switches configured to control one or more additional transmit signal paths and receive signal paths.

In accordance with another embodiment, a front-end signal routing switch for use with a communication transceiver may comprise: a first plurality of switches each having a common terminal configured to be connected to a transmit signal path of the communication transceiver, and a second plurality of switches each having a common terminal connected to a receive signal path of the communication transceiver; wherein the signal routing and switching front may be configured such that only one of the switches of the first plurality of switches is electrically present in the transmit signal path during transmit operations of the communication transceiver, and only one of the switches of the second plurality of switches is electrically present in the receive signal path during receive operations of the communication transceiver. A control module having a plurality of output ports may be utilized, and each output port may be electrically connected to one of the switches of the first and second plurality of switches.

Inductive elements such as, for example, inductors, may be utilized and configured to reduce an off capacitance of the plurality of switches (e.g., transistors) that are not turned on. The inductive elements may comprise an inductor connected in series with the transmit signal path. The inductive elements may comprise an inductive element connected between the common receive signal path and ground. In other embodiments, the inductive elements may comprise a plurality of inductors and a third plurality of switches each switch connected between one of the inductors and one of the first and second plurality switches. The controller may be configured to control the third plurality of switches to select a subset of at least one of the plurality of inductors to tune the bandwidth of at least one of the first and second plurality of switches.

A communication front-end may include: a communication transceiver comprising a transmitter and a receiver, a plurality of communication links, each communication link comprising an antenna configured to transmit or receive communication signals, a T/R and routing switch comprising a first terminal communicatively coupled to the transmitter and a second terminal communicatively coupled to the receiver and a plurality of third terminals, each communicatively coupled to one of the plurality of communication links.

The T/R and routing switch may comprise a first plurality of switches, each switch of the first plurality of switches having an input terminal, an output terminal and a control terminal, wherein the input terminals of each of the first plurality of switches may be electrically connected to the first terminal, a second plurality of switches, each switch of the second plurality of switches having an input terminal, an output terminal, and a control terminal.

The output terminals of each of the switches may be electrically connected to the second terminal, and a plurality of interconnects, each interconnect connecting an output terminal of one of the first plurality of switches with an input terminal of one of the second plurality of switches and with one of the plurality of third terminals. In various embodiments, the system may be configured such that only a single switch of the T/R and routing switch is used to route a transmit signal or a receive signal between the communication transceiver and one of the communication links. In another example scenario, the system can be configured such that only a single one of the first and second plurality of switches is inserted in-line to perform front-end routing of either a transmit signal or a receive signal between the transmitter or the receiver of the communication transceiver and one of the plurality communication links.

The system may comprise a controller operable to actuate one of the plurality of switches to electrically connect one of a transmit and a receive signal path of a communication transceiver to one of a plurality of communication links. In various embodiments, the switches may comprise a transistor and the communication transceiver may comprise a TDD transceiver.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a multi-band transceiver front-end architecture with reduced insertion loss.

Accordingly, aspects of the disclosure may be realized in hardware, software, firmware or a combination thereof. The disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present disclosure may be implemented as a board level product, as a single chip, application specific integrated circuit (ASIC), or with varying levels integrated on a single chip with other portions of the system as separate components. The degree of integration of the system is primarily determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present disclosure may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present disclosure.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
   in a transceiver comprising a first plurality of switches each with a separate input terminal and a common terminal coupled to a transmit signal path, a second plurality of switches each with a separate input terminal and a common terminal coupled to a receive signal path, and a plurality of communications links:
   operatively coupling the transmit signal path to one of the plurality of communications links using one of the first plurality of switches when the transceiver is in a transmit mode; and
   operatively coupling the receive signal path to one of the plurality of communications links using one of the second plurality of switches when the transceiver is in a receive mode.

2. The method according to claim 1, comprising reducing an off capacitance of one or both of the first and second pluralities of switches utilizing an operatively coupled inductive element.

3. The method according to claim 2, wherein the inductive element comprises an inductor operatively coupled in series with the transmit signal path.

4. The method according to claim 2, wherein the inductive element comprises an inductor operatively coupled between the coupled receive signal path and ground.

5. The method according to claim 2, comprising coupling the inductive element to the one or both of the first and second pluralities of switches utilizing one of a third plurality of switches.

6. The method according to claim 1, comprising tuning a bandwidth of one or both of the first and second pluralities of switches by operatively coupling at least one inductor to one or both of the first and second pluralities of switches.

7. The method according to claim 1, wherein the transceiver is a time division duplex (TDD) transceiver.

8. The method according to claim 1, comprising receiving signals via one of said plurality of communications links when in said receive mode.

9. The method according to claim 1, comprising transmitting signals over one of said plurality of communications links when in said transmit mode.

10. A transceiver for communicating signals, the transceiver comprising:
- a first plurality of switches, each with a separate input terminal and a common terminal coupled to a transmit signal path;
- a second plurality of switches, each with a separate input terminal and a common terminal coupled to a receive signal path;
- a controller; and
- a plurality of communications links, each coupled to one of the first plurality of switches and one of the second plurality of switches, wherein said controller:
  - operatively couples said transmit signal path to one of said plurality of communications links utilizing one of said first plurality of switches when in a transmit mode; and
  - operatively couples one of said plurality of communications links to said receive signal path utilizing one of said second plurality of switches when in a receive mode.

11. The transceiver according to claim 10, wherein said controller reduces an off capacitance of one or both of the first and second pluralities of switches utilizing an operatively coupled inductive element.

12. The transceiver according to claim 11, wherein the inductive element comprises an inductor operatively coupled in series with the transmit signal path.

13. The transceiver according to claim 11, wherein the inductive element comprises an inductor operatively coupled between the coupled receive signal path and ground.

14. The transceiver according to claim 11, wherein said controller operatively couples the inductive element to the one or both of the first and second pluralities of switches utilizing one of a third plurality of switches.

15. The transceiver according to claim 10, wherein said controller tunes a bandwidth of one or both of the first and second pluralities of switches by operatively coupling at least one inductor to the one or both of the first and second pluralities of switches.

16. The transceiver according to claim 10, wherein the transceiver is a time division duplex (TDD) transceiver.

17. The transceiver according to claim 10, wherein said transceiver receives signals via one of said plurality of communications links when in said receive mode.

18. The transceiver according to claim 10, wherein said transceiver transmits signals over one of said plurality of communications links when in said transmit mode.

19. A transceiver for communicating signals, the transceiver comprising:
- a first plurality of switches, each with a separate input terminal and a common terminal coupled to a transmit signal path;
- a second plurality of switches, each with a separate input terminal and a common terminal coupled to a receive signal path;
- a controller; and
- a plurality of communications links comprising at least one antenna, each link coupled to one of the first plurality of switches and one of the second plurality of switches, wherein said controller:
  - operatively couples said transmit signal path to one of said plurality of communications links utilizing one of said first plurality of switches when in a transmit mode, wherein only one of the first plurality of switches is present in an electrical path from the transmit signal path to the one of the plurality of communications links when in the transmit mode; and
  - operatively couples one of said plurality of communications links to said receive signal path utilizing one of said second plurality of switches when in a receive mode, wherein only one of the second plurality of switches is present in an electrical path from the receive signal path to the one of the plurality of communications links when in the receive mode.

20. The transceiver according to claim 19, wherein said controller reduces an off capacitance of one or both of the first and second pluralities of switches utilizing an operatively coupled inductive element.

* * * * *